(12) United States Patent  
Tilton

(10) Patent No.: US 6,598,930 B1
(45) Date of Patent: Jul. 29, 2003

(54) DUAL PURPOSE TRUCK BED COVER

(76) Inventor: James Tilton, 38448 20th St. E., Palmdale, CA (US) 93550

( * ) Notice: Subject to any disclaimer, the term of this patent is extended or adjusted under 35 U.S.C. 154(b) by 0 days.

(21) Appl. No.: 10/217,231

(22) Filed: Aug. 13, 2002

(51) Int. Cl.[7] .................................................. B60P 7/02
(52) U.S. Cl. .................................................. 296/100.06
(58) Field of Search ........................ 296/100.06, 100.1, 296/100.08, 100.07

(56) References Cited

U.S. PATENT DOCUMENTS

| | | | | |
|---|---|---|---|---|
| 2,997,330 A | * | 8/1961 | Boultinghouse | |
| 3,069,199 A | * | 12/1962 | Reardon et al. | |
| 3,858,744 A | * | 1/1975 | Garvert | |
| 4,531,775 A | * | 7/1985 | Beals | |
| 5,009,457 A | * | 4/1991 | Hall | |
| 5,110,021 A | * | 5/1992 | Dawson, Jr. | |
| 5,209,543 A | * | 5/1993 | Harkins, Jr. | |
| 6,254,169 B1 | * | 7/2001 | Arthur | 296/100.07 |
| 6,340,195 B1 | * | 1/2002 | Hall et al. | 296/100.07 |

* cited by examiner

Primary Examiner—Joseph D. Pape
(74) Attorney, Agent, or Firm—Roger A. Marrs

(57) ABSTRACT

A dual purpose truck bed cover includes a pair of door panels that are hinged respectively to the sidewalls of a truck bed. The panels are suitable for deployment into an upwardly raised position so as to extend the height of the cargo bed storage cavity of the truck. In such a raised position, stabilizing braces are provided for releasably supporting the panels in the upright, raised position. The door panels are alternately deployed into a closed position completely covering the storage cavity of the truck bed and a latch device is provided for releasably holding the door panels in the closed position.

4 Claims, 1 Drawing Sheet

DUAL PURPOSE TRUCK BED COVER

BACKGROUND OF THE INVENTION

1. Field of the Invention

The present invention relates to the field of covers or lids for open beds on trucks, and more particularly to a novel cover for a truck bed which in its extended position permits higher loads than usual to be carried and in its alternate closed position, serves as a cover for loads being carried on the truck bed.

2. Brief Description of the Prior Art

In the past, it has been the conventional practice to carry loads in the truck bed and to cover the load with tarps, canvass covers or, in some cases, a plastic lid. In these instances, the covers or lids are releasably attached to the sides of the truck bed and are stretched or extended across the bed from one side to the other. In other instances, a hingable lid or cover is attached at the end of the truck bed immediately behind the cab and when closed, covers the load.

However, problems and difficulties have been encountered with such conventional lids and covers which stem largely from the fact that when the cover is not being used, loads cannot extend too far above the sides of the truck bed; otherwise, the load or parts thereof would be lost during transit. Standard truck lids which are opened by means of a hinge at the front or cab end of the truck bed makes it very difficult and inconvenient to carry larger items unless the lid or cover is totally removed. Therefore, such a standard lid is very limited on the size of the cargo that can be placed into the truck bed and when the lid is removed, it requires storage in some safe place.

Therefore, there has been a long-standing need to provide a truck bed cover or lid which in one position may permit larger size loads or cargoes to be carried while in an alternate position, will operate as a complete cover to enclose the load or cargo totally within the truck bed. Another suitable brace stabilizer should be used to support the cover in the first position and suitable latches should be incorporated for maintaining the lid or cover in the closed position.

SUMMARY OF THE INVENTION

Accordingly, the above problems and difficulties are avoided by the present invention which provides a novel dual purpose truck bed cover that includes a pair of door panels which can be hinged respectively to the sidewalls of a conventional truck bed. The panels are suitable for deployment into an upwardly raised position so as to extend the height of the cargo bed of the truck. In such a raised position, stabilizing means are provided for releasibly supporting the panels in the upright raised position. However, the door panels may be deployed into a closed position completely covering the storage cavity of the truck bed and suitable latch means are provided for holding the door panels in the closed position.

Therefore, it is among the primary objects of the present invention to provide a novel closure for a truck bed that may be extended so as to permit an increased cargo size to be carried in the truck or can be deployed into a closed position which completely covers the cargo compartment.

Another object of the invention is to provide a novel closure for a truck bed which includes a pair of hinged panels adapted to be raised from the sidewalls of the truck bed so that increased cargo load can be carried.

Yet another object of the invention is to provide a novel dual purpose closure for a truck bed storage compartment that can be raised to permit odd sized cargo loads to be carried or may be lowered into a closed position to completely cover loads in the storage compartment.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
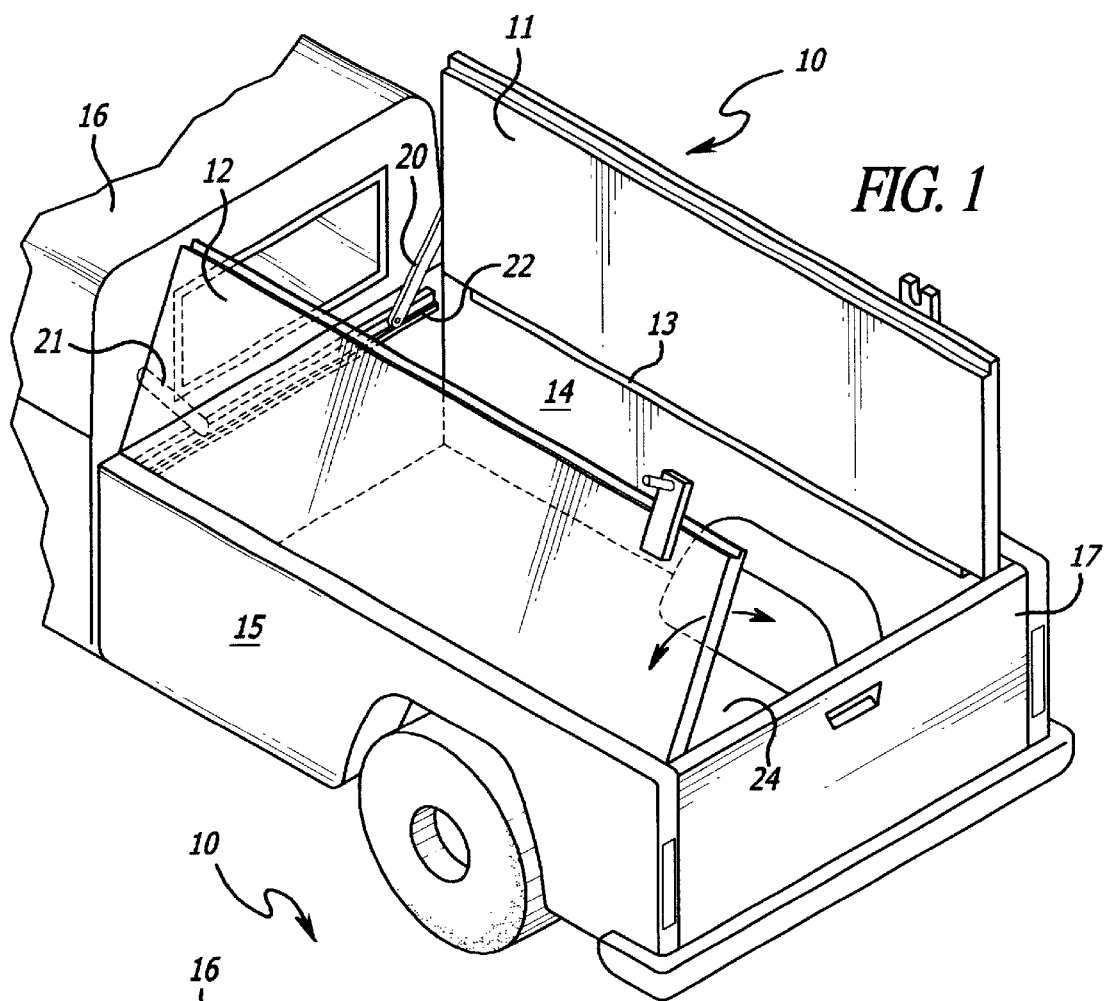
FIG. 1 is a rear perspective view of a truck incorporating the inventive dual purpose truck bed cover illustrated in its partially raised position.

Referring to FIG. 1, the novel truck bed cover is illustrated in the general direction of arrow 10 which includes a door panel 11 and a door panel 12. Each of the respective door panels is hinged to the inside of a truck bed sidewall, as indicated by hinge 13 connecting one edge of door 11 to sidewall 14. Door panel 12 is hinged in a similar manner to the inside of the sidewall 15 of the truck bed. The cab for the truck is indicated by numeral 16 and a tailgate closing the rear of the truck bed is indicated by numeral 17.

The door panels 11 and 12 are illustrated in FIG. 1 as being pivoted or deployed to a raised position so that the door panels are substantially in line with the sidewalls 14 and 15 respectively and form an upward extension so as to raise the height of the storage compartment in the truck bed. Therefore, when deployed in the raised position, the door panels permit a larger sized cargo to be carried. The door panels 11 and 12 are supported in the upward position by means of braces 20 and 21 having opposite ends riding in a track 22 fixed to the back of the cab 16 at the front of the truck bed. The ends of the braces 20 and 21 will slide through a slot formed in the track 22 while the opposite ends of each of the respective braces are hinged to the end of each of the respective door panels. The bottom of the cargo bed is indicated by numeral 24.

Figure 2:
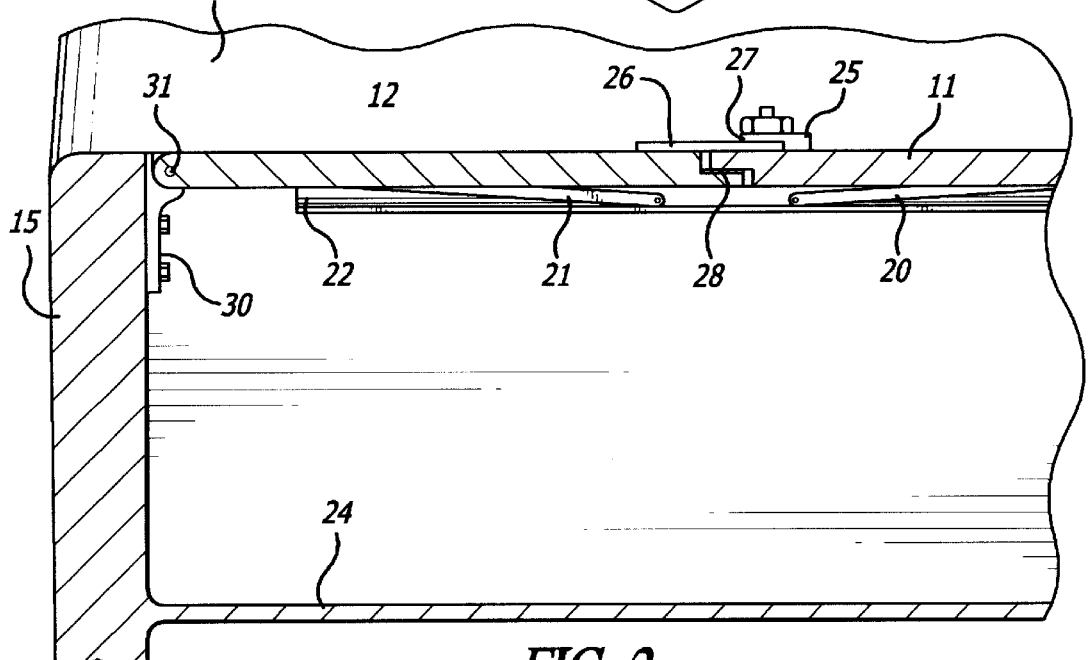
FIG. 2 is an enlarged transverse cross-sectional view of the dual purpose truck bed cover shown in FIG. 1 as illustrated in its closed position.

Referring now to FIG. 2, the door panels 11 and 12 are illustrated in an alternate or closed position wherein the door panels are pivoted about their respective hinges so as to cover the cargo compartment defined between sides 14 and 15 of the truck bed. The opposing edge marginal regions of the door panels are releasably held together by a conventional latch mechanism, indicated by numeral 25 which may take the form of a pivoting latch 26 that fits into a receiver 27. A thumb nut or other fastener may be employed to releasably hold or lock the door panels in the closed position. Also, it is preferable that the seal 28 may be employed to prevent moisture, debris or the like from passing between the opposing edges of the door panels. In the closed position, it can be seen that the braces 20 and 21 have permitted the door panels to be deployed into the closed position by having one end of each brace slide in the track 22.

FIG. 2 further illustrates that the respective door panels, such as panel 12, are hinged to a fixture 30 by means of hinge 31. The fixture 30 is securely bolted to the inside surface of the sidewall 15.

In view of the foregoing, it can be seen that the inventive door panels of the present invention cover the bed of the truck and protect any valuables which may be inside the storage compartment. When it is necessary to carry larger items, the door panels may be raised or deployed upwardly. All that the user need do is to fold the door panels upward from the center to each side of the truck bed sidewalls and lock in an upright position by means of the braces 20 and 21. When the user opens the door panels, each respective panel will be on an opposite side of the truck bed. The door panels or color may be fabricated from fiberglass or other durable material. It is to be understood that the subject invention is not limited to the illustrated underlying support for the cover system and that other ideas and constructions may be employed without deviating from the inventive concept.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A truck bed cover comprising:

a truck bed defined by a pair of spaced-apart parallel sidewalls and a pair of spaced-apart end panels establishing a storage cavity between said sidewalls and said end panels;

a pair of cover panels, each having a selected edge marginal region hingeably connected to a selected one of said sidewalls respectively and a closure edge marginal region adapted to releasably engage and secure with an opposing closure edge marginal region to close said storage cavity;

brace means adjustably mounted on a selected one of said end panels and interconnecting with each of said cover panels in an open position accessing said storage cavity;

said brace means includes a fixture secured to said selected end panel;

said fixture having an elongated horizontal slot;

brace members having opposite ends with one end slidably disposed in said slot and another end pivotally attached to said each of said pair of cover panels respectively; and said brace members releasably retaining said cover panels in said open position.

2. The truck bed cover defined in claim 1 wherein:

each of said cover panels are rectangular and equal in length and width to a length and half-width of said storage cavity.

3. The truck bed cover defined in claim 2 including:

manually operated latch means carried on said opposing edge marginal regions of said pair of cover panels for releasably coupling said pair of cover panels together.

4. The truck bed cover defined in claim 3 wherein:

said opposing edges of said pair of cover panels are of a reduced thickness so as to overlap for providing complete and unbroken coverage of said storage cavity.

* * * * *